United States Patent
Liu

(10) Patent No.: US 8,266,888 B2
(45) Date of Patent: Sep. 18, 2012

(54) COOLER IN NACELLE WITH RADIAL COOLANT

(75) Inventor: Xiaoliu Liu, Mississauga (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 392 days.

(21) Appl. No.: 12/822,220

(22) Filed: Jun. 24, 2010

(65) Prior Publication Data

US 2011/0314835 A1   Dec. 29, 2011

(51) Int. Cl.
*F02K 99/00* (2009.01)

(52) U.S. Cl. .......... 60/266; 60/226.3; 60/262; 60/226.1; 60/782; 60/785

(58) Field of Classification Search ............. 60/226.1, 60/226.3, 262, 266, 782, 785
See application file for complete search history.

(56) References Cited

U.S. PATENT DOCUMENTS

| | | | |
|---|---|---|---|
| 3,528,250 A * | 9/1970 | Johnson | 60/762 |
| 4,254,618 A * | 3/1981 | Elovic | 60/226.1 |
| 5,114,100 A | 5/1992 | Rudolph et al. | |
| 5,137,230 A | 8/1992 | Coffinberry | |
| 5,141,182 A | 8/1992 | Coffinberry | |
| 5,143,329 A | 9/1992 | Coffinberry | |
| 5,269,133 A | 12/1993 | Wallace | |
| 5,269,135 A | 12/1993 | Vermejan et al. | |
| 5,297,386 A | 3/1994 | Kervistin | |
| 5,782,077 A | 7/1998 | Porte | |
| 6,106,229 A | 8/2000 | Nikkanen et al. | |
| 6,134,880 A | 10/2000 | Yoshinaka | |
| 6,767,182 B2 | 7/2004 | Coppola | |
| 7,000,404 B2 | 2/2006 | Palmisano et al. | |
| 7,377,100 B2 | 5/2008 | Bruno et al. | |
| 7,568,336 B2 | 8/2009 | Brault et al. | |
| 2007/0130912 A1 * | 6/2007 | Kraft et al. | 60/226.1 |
| 2007/0245738 A1 * | 10/2007 | Stretton et al. | 60/728 |
| 2008/0271433 A1 | 11/2008 | Olver | |

* cited by examiner

*Primary Examiner* — William H Rodriguez
*Assistant Examiner* — Craig Kim
(74) *Attorney, Agent, or Firm* — Norton Rose Canada LLP

(57) ABSTRACT

A cooling system in an aircraft gas turbine engine includes a heat exchanger positioned within an annular nacelle space surrounding a bypass duct of the engine. The heat exchanger has a radial coolant passage extending between the bypass duct and ambient air surrounding the nacelle, and a flow passage extending substantially normal to the radial passage for direction of a fluid to be cooled therethrough. A configuration of this nature may assist in defining a no-flow length of the heat exchanger in a third direction normal to the other two mentioned directions, which may allow for improved performance within a given radial envelope.

7 Claims, 3 Drawing Sheets

COOLER IN NACELLE WITH RADIAL COOLANT

TECHNICAL FIELD

The describe subject matter relates generally to aircraft gas turbine engines, and more particularly to an improved cooling system in a turbofan gas turbine engine.

BACKGROUND

Modern gas turbine engines, particularly those utilized in aircraft applications, are using higher and higher air temperatures at the compressor outlet in order to increase the power and efficiency of the gas turbine engine. A certain quantity of hot and pressurized air is bled off at various stages of the compressors of gas turbine engines, referred to as compressor bleed air, to be used for various purposes. However, in some cases the hot compressor bleed air must be cooled before leading it to the user units such as air conditioning units providing air conditioning in a cabin of the aircraft. Therefore, a cooling system, and heat exchange in particular are required, which usually uses a portion of a bypass airflow bled off the bypass air duct of a turbofan gas turbine engine. Compact heat exchangers are usually required in this type of cooling system. Various compact heat exchangers of air/air type and various cooling systems in the prior art are available for aircraft engine applications. However, continuous efforts have been made to improve those heat exchangers and cooling systems in order to minimize the size and weight of the heat exchangers and cooling systems, while satisfying the required cooling capacity of the heat exchangers and cooling systems in aircraft engine applications.

Accordingly, there is a need to provide an improved cooling system for cooling compressor bleed air in turbofan gas turbine engines.

SUMMARY

In accordance with one aspect, the described subject matter provides a cooling system in an aircraft gas turbine engine having a bypass air duct around a core engine for directing a bypass air flow therethrough, the engine having a main axis of rotation defining axial, radial and tangential directions, the cooling system comprising a heat exchanger disposed between an annular outer nacelle wall and an annular outer wall of the bypass air duct, the heat exchanger having a first passage extending in a substantially radial direction through the outer wall of the bypass air duct to communicate with the bypass air duct and through the outer nacelle wall to communicate with ambient air surrounding the nacelle, thereby configured to direct a bypass air flow radially though the heat exchanger for discharge into the ambient environment, and the heat exchanger having a second passage extending in a direction substantially normal to the radial direction, the second passage communicating with a source of compressor bleed air and configured to direct said bleed air through the heat exchanger adjacent the first passage for cooling by the bypass air flow passing though the first passage.

In accordance with another aspect, the described subject matter provides a method for cooling compressor bleed air in an aircraft gas turbine engine having a bypass air duct around a core engine for directing a bypass air flow therethrough, the engine having a main axis of rotation defining axial, radial and tangential directions, the method comprising: directing bypass air radially through a first passage extending substantially radially through a nacelle space surrounding the bypass air duct, to thereby provide a radial coolant flow; and directing compressor bleed air through a second passage in said nacelle space in a direction substantially normal to the first passage, the second passage arranged in heat transfer communication with the first passage and thereby configured for heat transfer between the first and second passages to cool the compressor bleed air.

Further details of these and other aspects of the described subject matter will be apparent from the detailed description and figures included below.

DESCRIPTION OF THE DRAWINGS

Reference is now made to the accompanying drawings depicting aspects of the present invention, in which.

DETAILED DESCRIPTION

Figure 1:
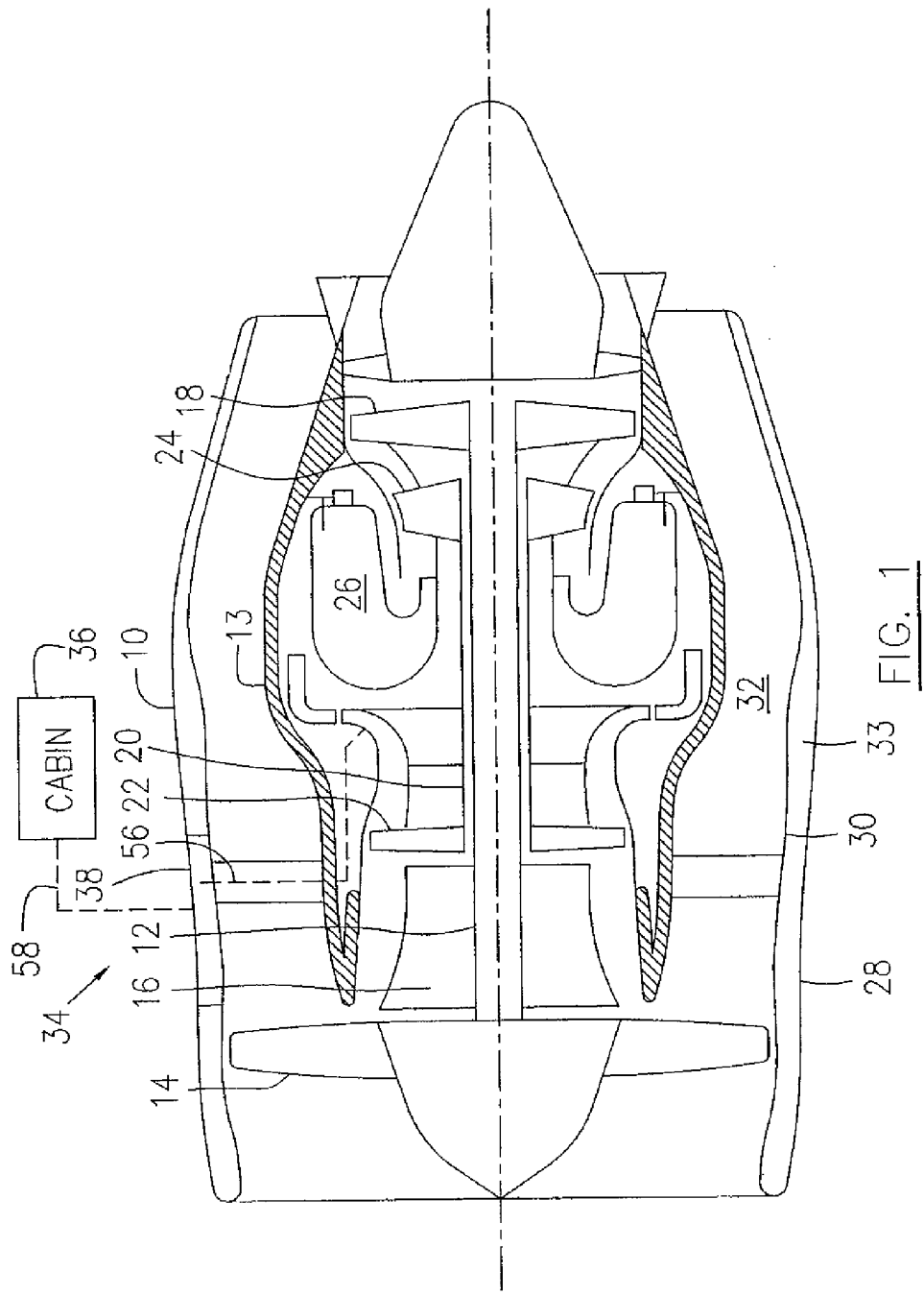
FIG. 1 is a schematic cross-sectional view of a turbofan gas turbine engine as an example of the application of the described subject matter, showing a cooling system including a heat exchanger positioned within a nacelle space of the engine.

FIG. 1 schematically illustrates a turbofan gas turbine engine which includes a nacelle configuration 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assembly 12 and 20 in order to define a main fluid path (not indicated) there through. In the main fluid path there is provided a combustion chamber 26 therein in which a combustion process takes place and produces combustion gasses to power the high and low turbine assemblies 24 and 18.

Figure 2A:
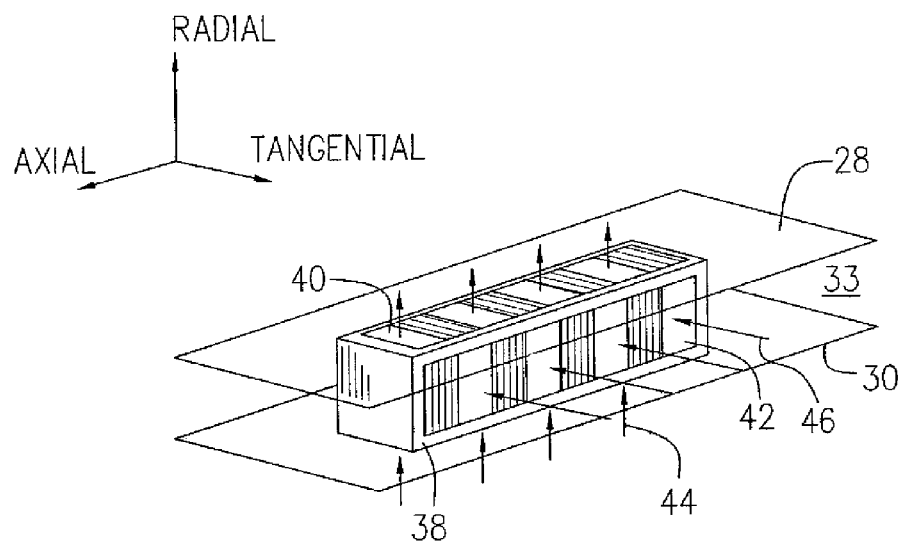
FIG. 2A is a schematic illustration of a heat exchanger of the cooling system in FIG. 1; according to one embodiment, showing the no-flow length of the heat exchanger in an axial direction of the nacelle space.

Referring to FIGS. 1 and 2A, the nacelle configuration 10 includes an annular outer nacelle wall 28 and an inner nacelle wall which is also an outer wall 30 of bypass air duct 32. The outer wall 30 of the bypass air duct 32 surrounds the core casing 13 to define the annular bypass air duct 32 for directing a bypass air flow (not indicated) driven by the fan assembly 14 to pass therethrough to be discharged at the exits of the bypass duct 32 in order to provide thrust to the engine. The outer nacelle wall 28 and the outer wall 30 of the bypass duct 32 in combination define an annular nacelle space 33 therebetween. It will be understood that, in order to reduce weight and aerodynamic losses of the aero engine 10, the nacelle space 33 is typically as small (i.e. radially) as possible.

A cooling system 34 for cooling a hot compressor bleed air for various purposes such as conditioning air in the cabin 36 of an aircraft to which the engine is mounted, includes a heat exchanger 38 which is positioned within the annular nacelle space 33 in an axial location downstream of the fan assemble 14 in order to use a portion of the bypass air flow as a coolant of the heat exchanger 38.

The heat exchanger 38 generally includes a first fluid passage 40 which for schematic illustration in this example, has a plurality of sub-passages which may be arranged in a parallel relationship as shown in FIG. 2A (only one of the first passages is indicated by numeral 40). The heat exchanger 38 further includes a second passage 42 which for schematic illustration, has four sub-passages in parallel relationship (only one of the sub-passages of the second passage is indicated by numeral 42). The first and second passages 40 and 42 extend in respective first and second directions which are normal to each other and coolant flow indicated by arrows 44 and hot compressor bleed air flow indicated by arrows 46 pass through the respective first and second passages 40 and 42 of the heat exchanger 38 for heat exchange. There is no fluid flow in a third direction, normal to both the first and second directions, i.e. normal to the directions of the first and second passages 40, 42. Therefore, this third direction is referred to as a no-flow direction and the term "no-flow length" defines a size of the cross-sectional area (the open area) of the first and second fluid passages 40, 42 in such a no-flow direction. Generally speaking, the larger the no-flow length of the heat exchanger 38, the larger the flow rate of the coolant flow 44 and hot compressor bleed air flow 46 passing through the respective first and second fluid passages 40, 42 of the heat exchanger 38. Therefore, a larger no-flow length of the heat exchanger 38 may permit a smaller sizing of other dimensions of heat exchanger 38 and yet still achieve a given cooling requirement.

The cooling system 34 positions the heat exchanger 38 within the nacelle space 33 such that the first fluid passage 40 extends in a substantially radial direction of the annular nacelle space 33 (the radial direction with respect to the engine axis shown in FIG. 1), and the second fluid passage 42 extends in a substantially tangential direction of the annular nacelle space 33 (the tangential direction with respect to the main engine axis as shown in FIG. 1). Therefore, the no-flow length of the heat exchanger 38 is oriented in the axial direction with respect to the main engine axis, shown in FIG. 1. In the illustrated nacelle configuration, the axial direction tends to be much less restricted for accommodating the heat exchanger 38, and may allow a relatively larger no-flow length for the heat exchanger 38 than would be possible for a configuration that has a radial no-flow length which must be positioned within the limited radial dimension of the annular nacelle space 33 between the outer nacelle wall 28 and the outer wall 30 of the bypass duct 32.

Due to the increased flexibility, in terms of the size of the no-flow length of the heat exchanger 38 relative to a configuration that has a radial no-flow length (not shown), the heat exchanger 38 may be made relatively compact in the tangential and radial directions, in contrast to a heat exchanger configuration (not shown) which is configured such that it defines its no-flow lengths in the radial direction (which, as mentioned is very limited).

Figure 2B:
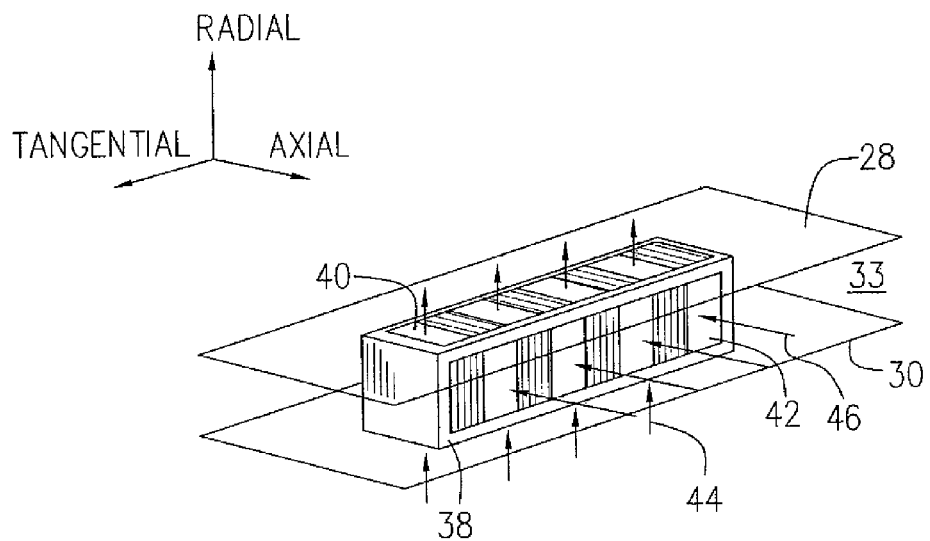
FIG. 2B is a schematic illustration of a heat exchanger of the cooling system of FIG. 1 according to another embodiment, showing the no-flow length of the heat exchanger in a tangential direction of the nacelle space.

In an alternative arrangement shown in FIG. 2B, the heat exchanger 38 may be positioned within the annular nacelle space 33 such that the first passage 40 is in a substantially radial direction of the annular nacelle space 33 for the radial coolant flow and the second passage 42 is in a substantially axial direction of the annular nacelle space 33, thereby defining the no-flow length of the heat exchanger 38 in the substantially tangential direction of the annular nacelle space 33 which is also less limited with respect to the very limited space in the radial direction of the annular nacelle space 33. This alternative position shown in FIG. 2B may be achieved by the heat exchanger 38 of FIG. 2A, being turned 90° or 270° within the nacelle space 33 about a radial axis. In the embodiments shown in FIGS. 2A and 2B, the heat exchanger no-flow length exceeds the radial height of the heat exchanger.

Figure 3:
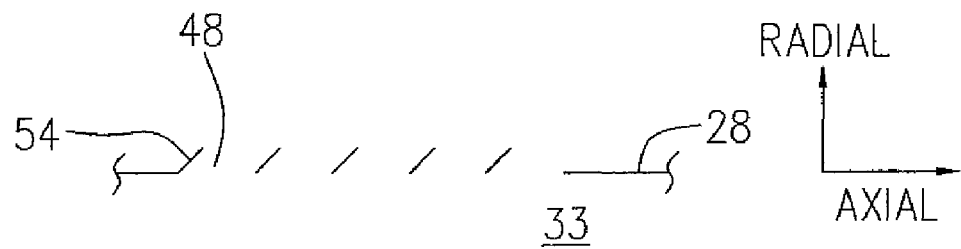
FIG. 3 is a schematic illustration of an exit defined on the outer nacelle wall of the engine for the radial coolant of the heat exchanger of FIG. 2A, according to one embodiment.
Figure 4A:
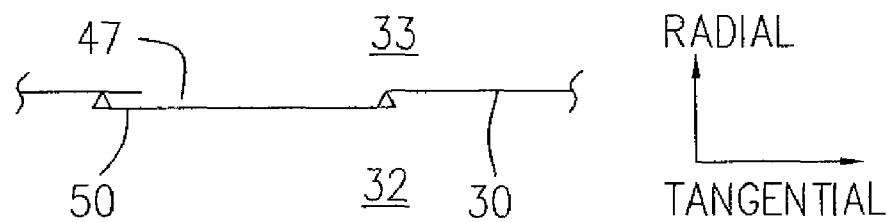
FIGS. 4A and 4B are schematic illustrations of alternative embodiments of an entry defined in the outer wall of the bypass air duct of the engine for the radial coolant of the heat exchanger of FIG. 2A.
Figure 4B:
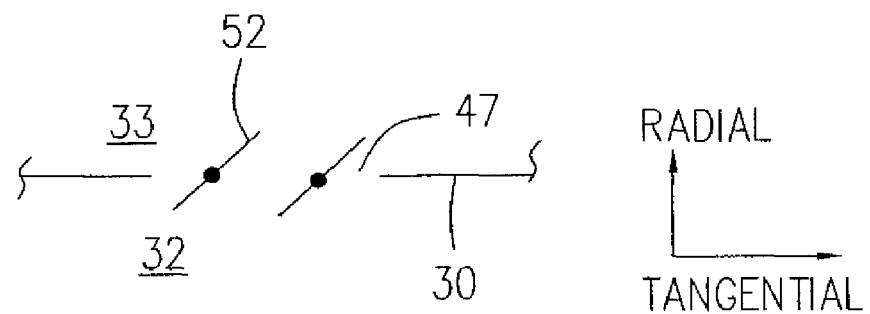

In the above-described two positions of the heat exchanger 38, it is convenient to input and output the coolant flow 44 into and from the radially extending first fluid passage 40 without additional tube lines when a portion of the bypass airflow passing through the annular bypass air duct 32 is used as the coolant. For example, an opening 47 defined in the outer wall 30 of the bypass air duct 32, as shown in FIGS. 4A and 4B, aligns with the heat exchanger 38 positioned within the annular nacelle space 33 (not shown in FIGS. 4A and 4B), to form an entry of the first passage 40 of the heat exchanger 38 for intake of a portion of the bypass air flow as the coolant flow 44 (see FIG. 2A). Similarly, an opening 48 may be provided in the outer nacelle wall 28 as shown in FIG. 3, aligning with the heat exchanger 38 positioned within the annular nacelle space 33 (not shown in FIG. 3), to form an exit of the first passage 40 of the heat exchanger 38 of FIG. 2A for discharging a portion of the bypass air flow as the coolant flow exhausted from the first passage 40, into the ambient environment surrounding the engine.

As shown in FIGS. 4A and 4B, the opening 47 in the outer wall 30 of the bypass air duct 32 may be provided with a flow control device such as a sliding door 50 or flapping door 52, to control a coolant flow rate at a desired level. As shown in FIG. 3, a plurality of louvers 54 may be provided in the opening 48 defined in the outer nacelle wall 28, for directing the exhausted coolant flow 44 toward a rearward direction of the engine.

Referring to FIGS. 1, 2A and 2B again, a first tube line 56 may be provided to connect the second passage 42 of the heat exchanger 38 to a source of the compressor bleed air which may include different stages of the low and high compressor assemblies 16, 22, for input of the hot compressor bleed air flow 46 to the second fluid passage 42 of the heat exchanger 38. The first tube line 56 may include various control members and mixing and metering devices for regulating the hot compressor air flow 46 to be cooled in the heat exchanger 38. A second tube line 58 may be provided to connect the second fluid passage 42 at a downstream end of the heat exchanger 38 to, for example, the cabin 36 of the aircraft for delivery of the compressor bleed air 46 which is now cooled, from the heat exchanger 38 to the cabin 36.

The above description is meant to be exemplary only, and one skilled in the art will recognize that changes may be made to the embodiments described without departure from the scope of the described subject matter. For example, the above-described concept of configuring and positioning the heat exchanger 38 within the nacelle space 33 of a turbofan gas turbine engine is not particularly reliant upon specific structural configurations of the heat exchanger. Many types of heat exchangers suitable for positioning within the nacelle space in order to use a portion of the bypass air flow as the coolant flow, are applicable for the above-described concept in order to significantly increase heat exchange efficiency and/or reduce the size and weight of the heat exchanger. For example, as shown in FIGS. 2A and 2B, the heat exchanger 38 may be configured in a compact plate/fin configuration in which a plurality of parallel partitioning plates divide a space within a housing into a number of parallel layers of the space.

A first group of layers which are spaced one from another by one adjacent layer of a second group, are configured as the first passage 40 in one direction while the second group of layers are configured as the second fluid passage 42 in another direction normal to the first direction. As another example, the heat exchanger 38 may be configured as a compact shell/tube type (not shown) in which parallel tubes extending through the heat exchanger housing, form the second fluid passage for the hot compressor bleed air while the space within the heat exchanger housing surrounding the tubes forms a first fluid passage for a coolant flow passing through a heat exchanger in a direction normal to the tubes. The above-described examples of the heat exchanger 38 cannot and are not intended to be an exhaustive list of all of the structural configurations of the heat exchangers which are applicable to the described concept for configuring and positioning heat exchangers in the nacelle space of a turbofan gas turbine engine. Still other modifications which fall within the scope of the described subject matter will be apparent to those skilled in the art, in light of a review of this disclosure, and such modifications are intended to fall within the appended claims.

The invention claimed is:

1. A cooling system in an aircraft gas turbine engine having a bypass air duct around a core engine for directing a bypass air flow therethrough, the engine having a main axis of rotation defining axial, radial and tangential directions, the radial and tangential directions being normal to the axial direction the cooling system comprising a heat exchanger disposed between an annular outer wall of the bypass air duct and an annular outer nacelle wall surrounding the annular outer wall or the bypass duct, the heat exchanger having a first passage extending in a substantially radial direction through the outer wall of the bypass air duct to communicate with the bypass air duct and through the outer nacelle wall to communicate with ambient air surrounding the nacelle, thereby configured to direct a bypass air flow radially though the heat exchanger for discharge into the ambient environment, the heat exchanger having a second passage extending in a substantially tangential direction and communicating with a source of compressor bleed air and configured to direct said bleed air through the heat exchanger adjacent the first passage for cooling by the bypass air flow passing though the first passage, and the heat exchanger having no flow passing through said axial direction to define a no-flow length of the heat exchanger substantially in said axial direction.

2. The cooling system as defined in claim 1 wherein the heat exchanger no-flow length exceeds a radial height of the heat exchanger.

3. A method for cooling compressor bleed air in an aircraft gas turbine engine having a bypass air duct around a core engine for directing a bypass air flow therethrough, the engine having a main axis of rotation defining axial, radial and tangential directions, the radial and tangential directions being normal to the axial direction, the method comprising:
   directing bypass air through a first passage extending substantially radially through a nacelle space surrounding the bypass air duct, to thereby provide a radial coolant flow; and
   directing compressor bleed air through a second passage extending substantially tangentially in said nacelle space, the second passage arranged in heat transfer communication with the first passage and thereby configured for heat transfer between the first and second passages to cool the compressor bleed air, thereby resulting in no flow passing through said axial direction to define a no-flow length of the first and second passages substantially in said axial direction.

4. The method as defined in claim 3 further comprising a step of providing an opening in an outer wall of the bypass air duct to form an entry of the first passage for intake of said bypass air.

5. The method as defined in claim 3 further comprising a step of providing an opening in an outer nacelle wall to form an exit of the first passage for discharging said bypass air into ambient air.

6. The method as defined in claim 3 further comprising a step of connecting the second passage with a first tube line for input of a hot compressor bleed air flow to the second passage.

7. The method as defined in claim 3 further comprising a step of connecting the second passage of the heat exchanger with a second tube line for output of a cooled compressor bleed air flow from the second passage.

* * * * *